United States Patent
Cao et al.

(10) Patent No.: US 12,249,905 B2
(45) Date of Patent: Mar. 11, 2025

(54) SERIAL-PARALLEL CONVERTER PROTECTION SYSTEM, CONTROLLER, AND CONVERTER

(71) Applicant: Huawei Digital Power Technologies Co., Ltd., Shenzhen (CN)

(72) Inventors: Zhen Cao, Shanghai (CN); Dong Chen, Shanghai (CN); Xiaofeng Yao, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 97 days.

(21) Appl. No.: 18/174,855

(22) Filed: Feb. 27, 2023

(65) Prior Publication Data

US 2023/0223835 A1 Jul. 13, 2023

Related U.S. Application Data

(63) Continuation of application No. PCT/CN2021/093999, filed on May 17, 2021.

(30) Foreign Application Priority Data

Aug. 31, 2020 (CN) .......................... 202010899466.5

(51) Int. Cl.
  *H02M 1/088* (2006.01)
  *H02J 3/38* (2006.01)
  (Continued)

(52) U.S. Cl.
  CPC ............... *H02M 1/088* (2013.01); *H02J 3/38* (2013.01); *H02M 1/32* (2013.01); *H02M 3/158* (2013.01); *H02J 2300/24* (2020.01)

(58) Field of Classification Search
  CPC ...................................................... H02M 1/088
  (Continued)

(56) References Cited

U.S. PATENT DOCUMENTS 9,425,783 B2 8/2016 Avrutsky
2014/0103891 A1 4/2014 Stratakos et al.
(Continued)

FOREIGN PATENT DOCUMENTS

CN 103227588 A 7/2013
EP 3089339 A2 11/2016
(Continued)

*Primary Examiner* — Joseph Chang
(74) *Attorney, Agent, or Firm* — Maier & Maier, PLLC (57) ABSTRACT

A serial-parallel converter protection system includes a controller, a drive, a first switching transistor, and a second switching transistor. An input terminal of a converter is connected to an output terminal of the converter through the first switching transistor. The output terminal of the converter is connected in parallel with the second switching transistor. When an output voltage of the converter is greater than a first threshold, the controller controls the first switching transistor to be turned off and controls the second switching transistor to be turned on. In some embodiments, when the output voltage of the converter is greater than the first threshold, the controller controls the first switching transistor to be turned off and controls the second switching transistor to be turned on, so that the converter is bypassed, thereby preventing a voltage and a current from impacting a component inside the converter.

18 Claims, 8 Drawing Sheets

(51) Int. Cl.
*H02M 1/32* (2007.01)
*H02M 3/158* (2006.01)

(58) Field of Classification Search
USPC .......................................................... 307/43
See application file for complete search history.

(56) References Cited

U.S. PATENT DOCUMENTS

| | | | | |
|---|---|---|---|---|
| 2018/0316191 | A1* | 11/2018 | Zhu ........................... | H02J 3/46 |
| 2019/0181635 | A1* | 6/2019 | Okumura ............... | G01R 25/00 |
| 2019/0326758 | A1* | 10/2019 | Zhu .................... | H02M 3/33573 |
| 2020/0177100 | A1* | 6/2020 | Wang .................. | H02M 7/5387 |
| 2020/0295572 | A1* | 9/2020 | Yao ........................ | H02J 3/381 |

FOREIGN PATENT DOCUMENTS

| | | | |
|---|---|---|---|
| JP | 2002262544 | A | 9/2002 |
| JP | 2010521720 | A | 6/2010 |

* cited by examiner

SERIAL-PARALLEL CONVERTER PROTECTION SYSTEM, CONTROLLER, AND CONVERTER

CROSS-REFERENCE TO RELATED APPLICATIONS

This application is a continuation of International Application No. PCT/CN2021/093999, filed on May 17, 2021, which claims priority to Chinese Patent Application No. 202010899466.5, filed on Aug. 31, 2020. The disclosures of the aforementioned applications are hereby incorporated by reference in their entireties.

TECHNICAL FIELD

The embodiments relate to the field of circuit technologies, a serial-parallel converter protection system, a controller, and a converter.

BACKGROUND

A photovoltaic power optimizer may be connected to an inverter by using a plurality of converters that are connected in series and different optimizers may be connected to each other by connecting outputs in parallel, to increase input power.

The plurality of converters in the photovoltaic power optimizer are respectively connected to different photovoltaic panels. When a photovoltaic panel needs maintenance, a maintenance worker disconnects an input terminal of a corresponding converter. However, in this case, an output voltage of another optimizer that is connected to this optimizer by connecting outputs in parallel impacts a corresponding converter of the photovoltaic panel, thereby damaging a component inside the converter.

SUMMARY

The embodiments provide a serial-parallel converter protection system, a controller, and a converter. The converter is bypassed when a voltage is excessively large, thereby preventing the voltage and a current from impacting a component inside the converter.

According to a first aspect, an embodiment provides a serial-parallel converter protection system, including a controller, a drive, a first switching transistor, and a second switching transistor. An input terminal of the converter is connected to an output terminal of the converter through the first switching transistor. The controller is connected to the first switching transistor through the drive and is configured to control on and off of the first switching transistor. The output terminal of the converter is connected in parallel with the second switching transistor, and the controller is connected to the second switching transistor through the drive and is configured to control on and off of the second switching transistor. When an output voltage of the converter is greater than a first threshold, the controller controls the first switching transistor to be turned off and controls the second switching transistor to be turned on. In this embodiment when the output voltage of the converter is greater than the first threshold, the controller controls the first switching transistor to be turned off and controls the second switching transistor to be turned on, so that the converter is bypassed, thereby preventing a voltage and a current from impacting a component inside the converter.

With reference to the first aspect, he input terminal of the converter is connected in parallel with a first capacitor, the output terminal of the converter is connected in parallel with a second capacitor, and an inductor is disposed on a connection cable between the second capacitor and the second switching transistor.

With reference to the first aspect, the system further includes an auxiliary power supply, and the auxiliary power supply is connected in parallel with the input terminal of the converter.

With reference to the first aspect, the first switching transistor is anti-parallel with a first diode, and the second switching transistor is anti-parallel with a second diode.

With reference to the first aspect, when an input voltage of the converter is less than a second threshold, the controller controls both the first switching transistor and the second transistor to be turned off.

With reference to the first aspect, when duration after the output voltage of the converter is greater than the first threshold for the first time is greater than a preset time threshold, the controller controls the second switching transistor to be turned off and re-detects the output voltage of the converter. If the output voltage of the converter is greater than the first threshold, the controller controls the first switching transistor to be turned off and controls the second switching transistor to be turned on; or if the output voltage of the converter is not greater than the first threshold, the converter operates normally. After the controller controls the second switching transistor to be turned off, the converter is reconnected to a power grid (exits a bypass state). If the output voltage of the converter returns to be normal, the converter operates normally. In some implementations, the controller may first control the first switching transistor to be turned on and control the second switching transistor to be turned off, and then perform re-detection.

With reference to the first aspect, the controller may control the second switching transistor to be turned on through pulse width modulation (PWM) chopping.

According to a second aspect, an embodiment may provide a controller. The controller is configured to perform the following steps: detecting an output voltage of a converter; and when the output voltage of the converter is greater than a first threshold, controlling a first switching transistor to be turned off and a second switching transistor to be turned on.

With reference to the second aspect, the controller is further configured to: when an input voltage of the converter is less than a second threshold, control both the first switching transistor and the second transistor to be turned off.

With reference to the second aspect, after controlling both the first switching transistor and the second switching transistor to be turned off when the input voltage of the converter is less than the second threshold, the controller is further configured to re-detect the output voltage of the converter.

With reference to the second aspect, when duration after the output voltage of the converter is greater than the first threshold for the first time is greater than a preset time threshold, the controller is further configured to control the second switching transistor to be turned off and re-detect the output voltage of the converter. If the output voltage of the converter is greater than the first threshold, the controller controls the first switching transistor to be turned off and controls the second switching transistor to be turned on; or if the output voltage of the converter is not greater than the first threshold, the converter operates normally.

According to a third aspect, an embodiment may provide a converter. The converter includes a converter circuit. An input terminal of the converter circuit is connected to at least one photovoltaic panel, and an output terminal of the converter circuit is connected to a power grid. A first switching transistor is connected between the input terminal and the output terminal of the converter circuit, and a second switching transistor is connected to the output terminal of the converter circuit. The converter further includes the serial-parallel converter protection system according to the first aspect, and the serial-parallel converter protection system is connected to the converter circuit through the first switching transistor and the second switching transistor; or the converter further includes the controller according to the second aspect, and the controller is connected to the first switching transistor and the second switching transistor through a drive.

DETAILED DESCRIPTION OF THE EMBODIMENTS

The embodiments may provide a serial-parallel converter protection system, a controller, and a converter. The converter is bypassed when a voltage is excessively large, thereby preventing the voltage and a current from impacting a component inside the converter.

In the embodiments and the accompanying drawings, the terms "first", "second", "third", "fourth", and the like (if existent) are intended to distinguish between similar objects but do not necessarily indicate an order or sequence. It should be understood that the data termed in such a way is interchangeable in proper circumstances, so that the embodiments described herein can be implemented in other orders than the order illustrated or described herein. Moreover, terms "include", "correspond to", and any other variants thereof mean to cover non-exclusive inclusion. For example, a process, method, system, product, or device that includes a list of steps or units is not necessarily limited to those steps or units, but may include other steps or units not expressly listed or inherent to such a process, method, product, or device.

In addition, in the embodiments, the word "example" or "for example" is used to represent giving an example, an illustration, or a description. Any embodiment described with the word "example" or "for example" o should not be explained as being more preferred or having more advantages than another embodiment. Use of the word "example" or "for example" or the like may be intended to present a relative concept.

Figure 1:
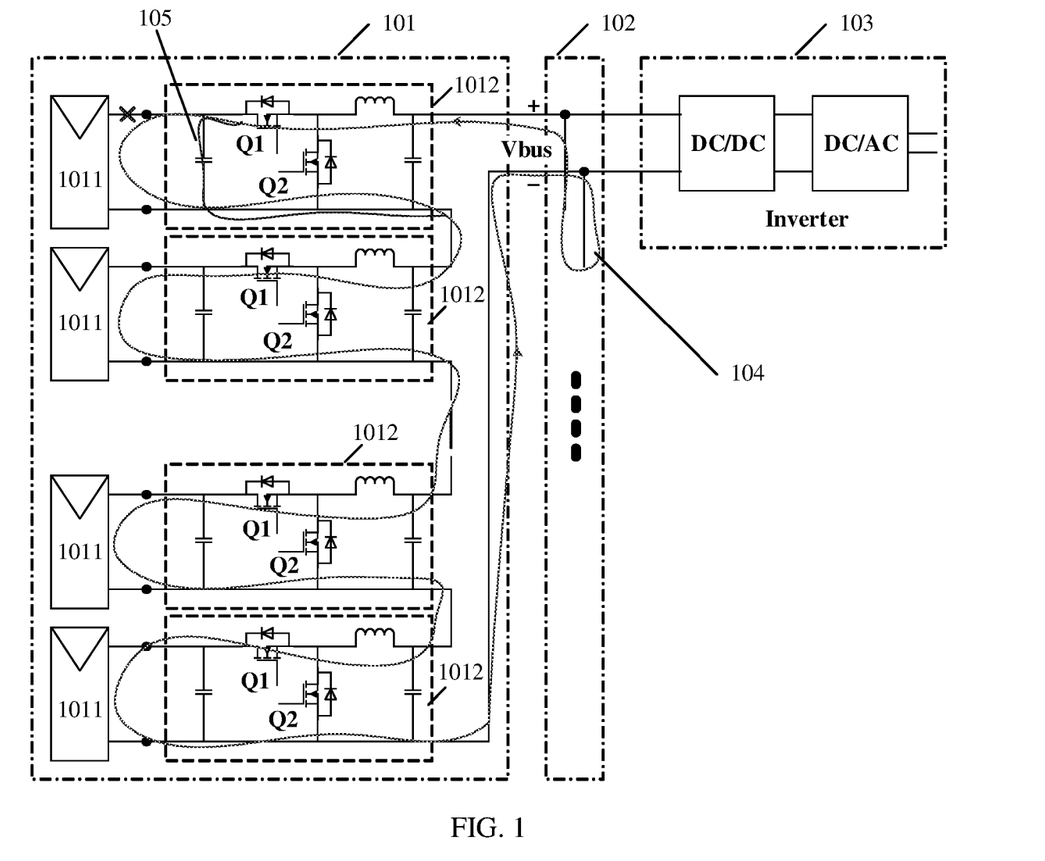
FIG. 1 is a schematic diagram of serial-parallel converters connected to an inverter.

FIG. 1 is a schematic diagram of serial-parallel converters connected to an inverter. After being connected in parallel, a first optimizer 101 and a second optimizer 102 are connected to an inverter 103. The first optimizer 101 includes a plurality of converters 1012, and an input terminal of each converter 1012 may be connected to a photovoltaic panel 1011. Two output terminals are formed after output terminals of the converters 1012 are connected in parallel in a manner shown in FIG. 1, and the two output terminals are used as output terminals of the first optimizer 101.

An internal structure of the second optimizer 102 may be similar to that of the first optimizer 101 and is not drawn in detail in FIG. 1, and details are not described herein again. In some other cases, the second optimizer 102 may alternatively have another internal structure. This is not limited in this embodiment.

In the first optimizer 101, the photovoltaic panel 1011 may be an apparatus for converting solar energy into electric power. A model, a mounting manner, an area, and the like of the photovoltaic panel are not limited in this embodiment. In another new energy power generating system or an energy storage system, the photovoltaic panel 1011 may be replaced with a corresponding apparatus. For example, in a wind energy power generating system, the photovoltaic panel 1011 may be replaced with a wind-driven generator. For another example, in an energy storage system, the photovoltaic panel 1011 may be replaced with an energy storage battery. In actual application, the photovoltaic panel 1011 may be replaced with a different apparatus according to an actual requirement, and is connected to a converter 1012. Details are not described in this embodiment.

In the first optimizer 101, the converter 1012 may be a direct current-direct current converter. In actual application, the converter 1012 may alternatively be another type of converter. This is not limited in this embodiment.

Figure 2:
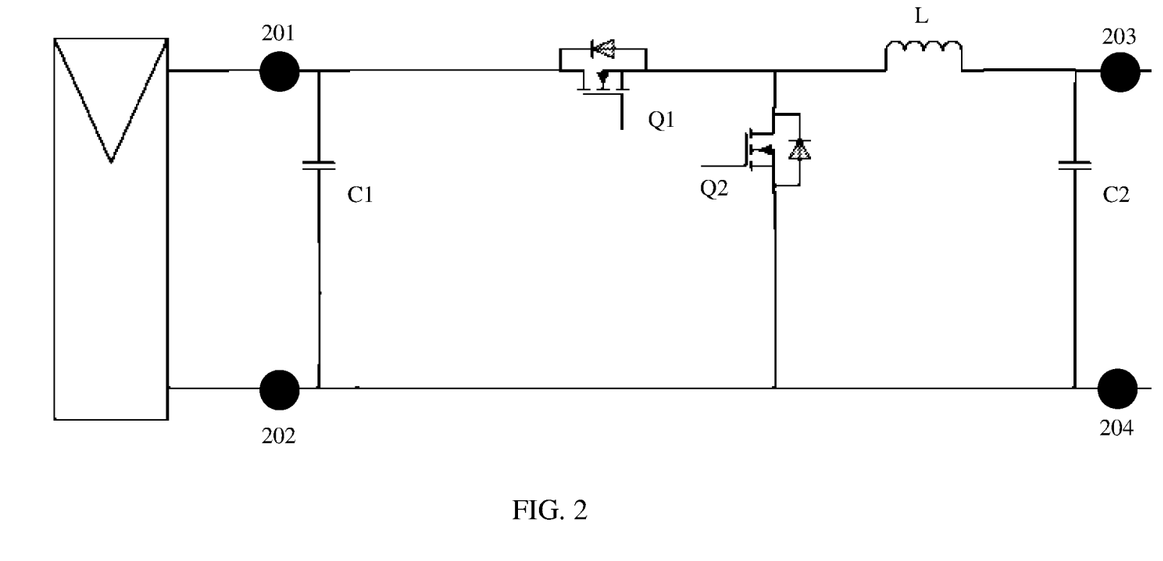
FIG. 2 is a schematic diagram of an internal structure of a converter 1012.

FIG. 2 is a schematic diagram of an internal structure of the converter 1012. The internal structure of the converter 1012 may include a switching transistor Q1, a switching transistor Q2, a capacitor C1, a capacitor C2, and an inductor L. The capacitor C1 is connected in parallel between an input terminal 201 and an input terminal 202 of the converter, and the capacitor C2 is connected in parallel between an output terminal 203 and an output terminal 204 of the converter. The switching transistor Q1 and the inductor L are connected in series between the input terminal 201 and the output terminal 203. The switching transistor Q2 is connected in parallel between the output terminal 204 and a connection terminal of the switching transistor Q1 and the inductor L.

The switching transistor Q1 or the switching transistor Q2 may be a triode, a MOS transistor, or a transistor of another type in actual application, for example, an insulated gate bipolar transistor (IGBT). This is not limited in this embodiment. In some embodiments, the switching transistor Q1 and the switching transistor Q2 each may be anti-parallel with a diode.

With reference to FIG. 1, when a first photovoltaic panel 1011 of the first optimizer 101 needs maintenance or replacement, a worker disconnects an input terminal of a corresponding converter 1012. In this case, an output voltage of the second optimizer 102 impacts the converter 1012, thereby damaging a component (for example, a capacitor or a switching transistor) inside the converter. In FIG. 1, a line 104 is a current path before the worker disconnects the input terminal of the corresponding converter 1012, and a line 105 is a current path after the worker disconnects the input terminal of the corresponding converter 1012. It can be understood that after the worker disconnects the input terminal of the corresponding converter 1012, a current and a voltage are applied to an input capacitor, and the capacitor is damaged. In some cases, the current and the voltage may further impact the switching transistor Q2, and the switching transistor Q2 is damaged.

Figure 3:
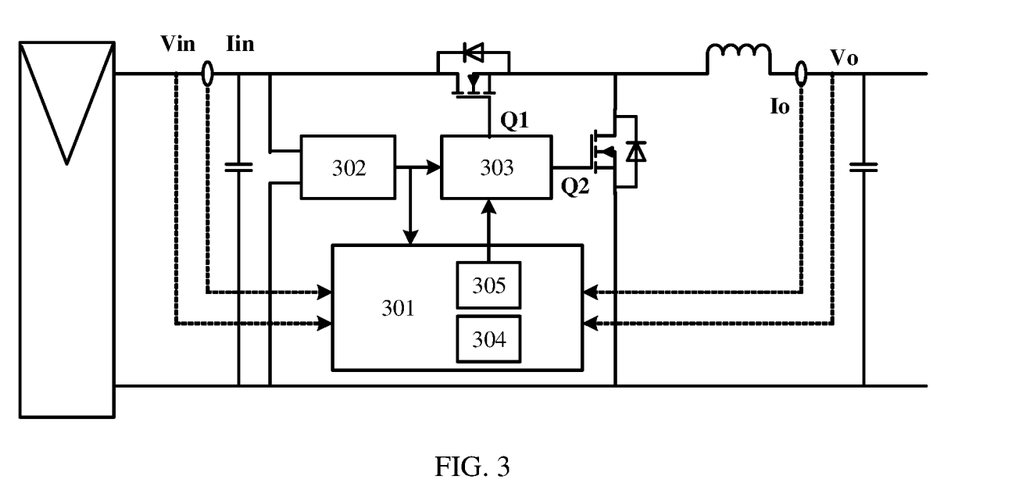
FIG. 3 is a schematic diagram of a serial-parallel converter protection system.

To resolve the foregoing problem, the embodiments may provide a serial-parallel converter protection system, as shown in FIG. 3. FIG. 3 is a schematic diagram of a serial-parallel converter protection system. The serial-parallel converter protection system includes: a controller 301, a drive 303, a switching transistor Q1, and a switching transistor Q2. A connection relationship of the switching transistor Q1, the switching transistor Q2, an input capacitor, an output capacitor, an inductor, and the like is similar to that of the corresponding converter in FIG. 2, and details are not described herein again. The input terminal of the converter may be connected to the output terminal of the converter through the switching transistor Q1, and the controller 301 may be connected to the switching transistor Q1 through the drive 303 and may be configured to control on and off of the switching transistor Q1. The output terminal of the converter is connected in parallel with the switching transistor Q2, and the controller 301 is connected to the switching transistor Q2 through the drive 303 and is configured to control on and off of the switching transistor Q2.

In this embodiment, when an output voltage Vo of the converter is greater than a first threshold, the controller controls the switching transistor Q1 to be turned off and controls the switching transistor Q2 to be turned on. That the output voltage Vo of the converter is greater than the first threshold shows that a voltage of the output terminal of the converter is high and damages a component inside the converter. Therefore, in this case, the controller 301 may control the switching transistor Q1 to be turned off and control the switching transistor Q2 to be turned on, so that a current path is short-circuited through the switching transistor Q2 instead of the switching transistor Q1 and is output to another output terminal. Actually, the converter 1012 is bypassed, thereby avoiding damage to the converter, and resolving a problem that the converter is damaged when the output voltage is excessively high.

Figure 4:
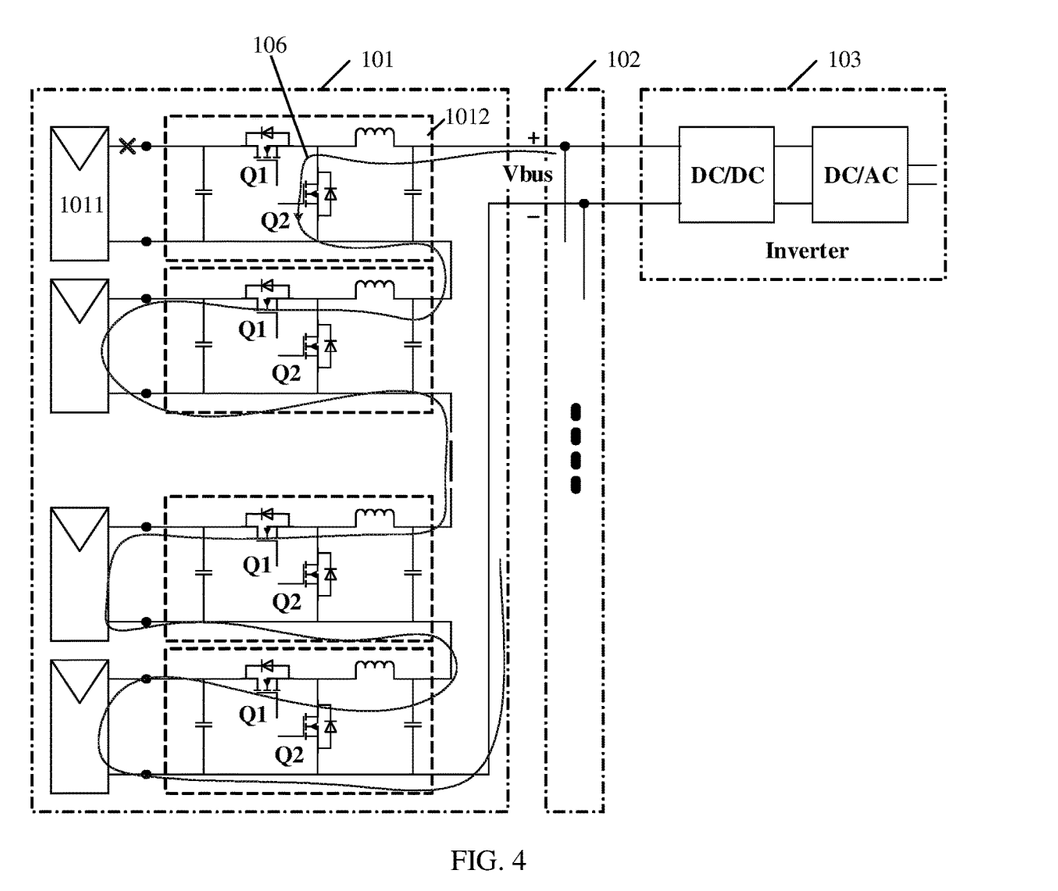
FIG. 4 is a schematic diagram of a current path in a protection process according to an embodiment.

FIG. 4 is a schematic diagram of a current path in a protection process according to an embodiment. As shown in FIG. 4, after the controller 301 controls the switching transistor Q1 to be turned off and controls the switching transistor Q2 to be turned on, the current path flows through the switching transistor Q2 in the converter 1012 (as shown by a line 106 in FIG. 4), and the converter 1012 is bypassed.

In actual application, the controller 301 may detect the output voltage Vo through a voltage detection unit 304. The voltage detection unit 304 may be a circuit or component that can detect a voltage, for example, a voltage sensor. This is not limited in this embodiment.

In actual application, the controller 301 may control the switching transistor Q1 and the switching transistor Q2 through the drive 303. The drive 303 may be a drive circuit that is configured to receive a control signal of the controller 301, convert the control signal into a corresponding high/low level, and output the level to the switching transistor Q1 and the switching transistor Q2, thereby controlling on and off of both the switching transistor Q1 and the switching transistor Q2. In this embodiment, a circuit or a structure of the drive 303 is not limited.

In some cases, an auxiliary power supply 302 provides electric energy for the controller 301 and the drive 303. An input terminal of the auxiliary power supply 302 is connected in parallel with the input terminal of the converter, and is configured to obtain electric energy. The auxiliary power supply 302 is further connected to the controller 301 and the drive 303, and is configured to output the obtained electric energy to the controller 301 and the drive 303.

After the controller controls the switching transistor Q1 to be turned off and controls the switching transistor Q2 to be turned on, an input voltage Vin and the output voltage Vo of the converter decrease. When the input voltage Vin of the converter decreases to a second threshold, the auxiliary power supply 302 may not obtain enough electric energy. Therefore, when the input voltage Vin of the converter decreases to the second threshold, the controller 301 may control both the switching transistor Q1 and the switching transistor Q2 to be turned off. As a result, a current of the second optimizer 102 continues to flow to the input terminal of the converter through a diode anti-parallel with the switching transistor Q1. In this way, the input voltage Vin of the converter increases, to maintain the power supply of the auxiliary power supply.

In this embodiment, through control logic of the controller 301, when the output voltage of the converter is excessively high, the switching transistor Q2 can be controlled to bypass the converter, to prevent an excessively high voltage from damaging a component inside the converter. On the other hand, when the input voltage of the converter is excessively low, the switching transistor Q2 can be controlled to be turned off, so that electric energy can continue to flow to the input terminal of the converter, thereby maintaining normal operation of the controller 301 and the drive 303, and implementing continuous protection of the converter.

After a worker maintains or replaces a photovoltaic panel 1011, a corresponding converter 1012 may be reconnected by the worker. In this case, the worker may input instructions to enable the controller 301 to control the switching transistor Q1 to be turned on and the switching transistor Q2 to be turned off, so that the converter 1012 resumes normal operation. When the worker does not input the instructions, the controller 301 may perform timing after detecting for the first time that the output voltage Vo of the converter is greater than the first threshold. When the timing reaches a preset time threshold, the controller 301 re-detects the output voltage Vo of the converter. If the output voltage Vo of the converter is less than the first threshold, the controller 301 may control the switching transistor Q1 to be turned on and the switching transistor Q2 to be turned off, so that the converter 1012 resumes normal operation. In this case, after the photovoltaic panel 1011 is reconnected to the converter by the worker, the controller 301 can automatically control the converter to resume normal operation, which is more automatic without operation of the worker.

Figure 5:
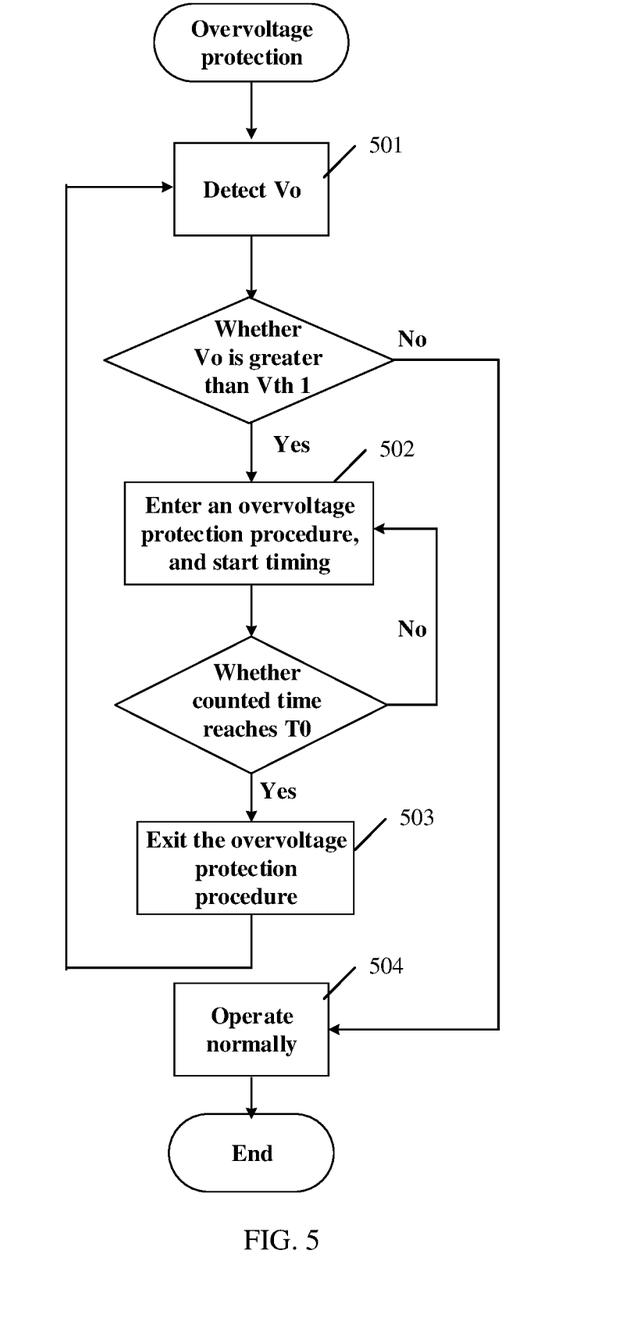
FIG. 5 is a flowchart of a protection policy method of a controller 301 according to an embodiment.

Based on the foregoing control logic, the controller 301 may perform steps shown in FIG. 5. FIG. 5 is a flowchart of a protection policy method of a controller 301 according to an embodiment. The process includes the following steps.

501: Detect an output voltage of a converter.

In this embodiment, the controller 301 may detect the output voltage Vo of the converter through a voltage detection unit 304. This is similar to the description of the foregoing embodiment, and details are not described herein again.

502: If the output voltage of the converter is greater than a first threshold, perform overvoltage protection, and start timing.

In this embodiment, the overvoltage protection may include following control logic:

when the output voltage Vo of the converter is greater than the first threshold, controlling a switching transistor Q1 to be turned off and a switching transistor Q2 to be turned on; and when an input voltage Vin of the converter is less than a second threshold, controlling both the switching transistor Q1 and the second switching transistor Q2 to be turned off.

In actual application, the foregoing control logic may be directly performed in the controller, or a related procedure (an overvoltage protection procedure) may be set to implement the foregoing logic. This is not limited in this embodiment.

Figure 6:
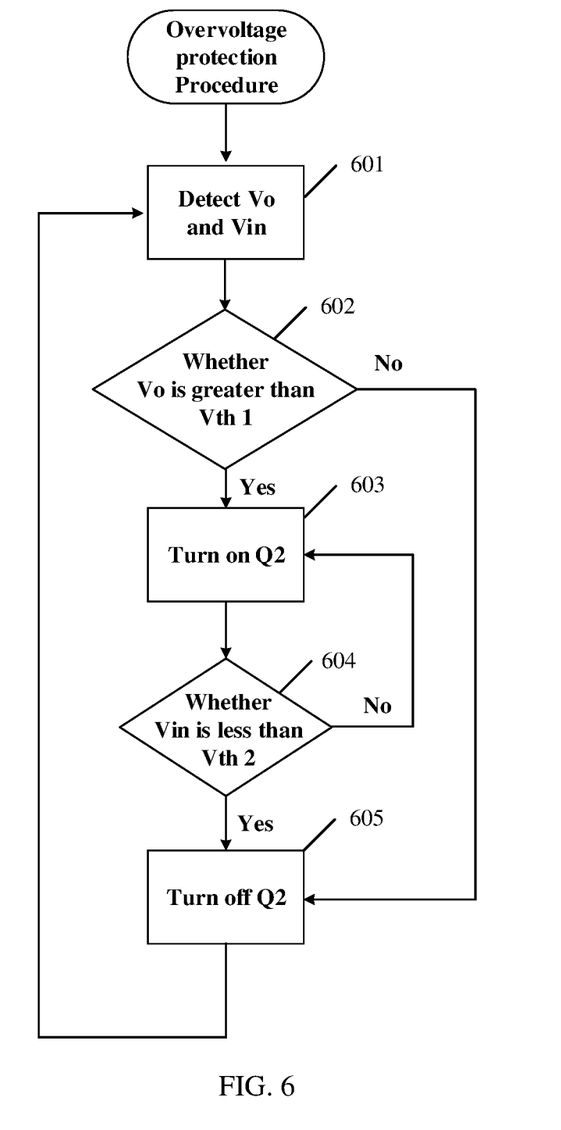
FIG. 6 is a flowchart of steps of overvoltage protection according to an embodiment.

For example, the overvoltage protection may perform steps as shown in FIG. 6, and for details, refer to a subsequent embodiment.

The overvoltage protection may control the output voltage Vo of the converter in a reasonable range, and maintain the input voltage Vin of the converter, to prevent power shortage of an auxiliary power supply 302. Therefore, when a worker replaces or maintains a photovoltaic panel 1011, the overvoltage protection may prevent damage to a component inside the converter due to an excessively high voltage.

503: If counted time reaches a preset time threshold, exit the overvoltage protection procedure, and return to perform step 501.

In this embodiment, the controller 301 may count time by using a timer. When the time counted by the timer reaches the preset time threshold, the controller 301 may exit the overvoltage protection procedure (or may control the switching transistor Q2 to be turned off, so that the converter is not bypassed), and then re-detect the output voltage of the converter. In some embodiments, after the controller 301 exits the overvoltage protection procedure, both the switching transistor Q1 and the switching transistor Q2 may be turned off, and step 401 is performed again (that is, re-detect the output voltage of the converter). It may be understood that, after a period of time, the worker may have completed the maintenance or replacement of the photovoltaic panel 1011 and reconnected the photovoltaic panel to the converter. Therefore, the converter is re-detected at regular intervals, so that restoration of normal operation can be implemented after the photovoltaic panel 1011 is reconnected to the converter.

504: If the output voltage of the converter is not greater than the first threshold, operate the converter normally.

In this embodiment, if the photovoltaic panel 1011 is not removed and the worker does not disconnect an input interface of the converter, the output voltage Vo of the converter may be in a normal operating state, and does not exceed the first threshold, so the converter operates normally. In may be understood that the controller 301 may control both the switching transistor Q1 and the switching transistor Q2 to return to work normally, so that the converter returns to operate normally. In some embodiments, the controller may control the switching transistor Q1 to be turned on and control the switching transistor Q2 to be turned off, so that the converter returns to operate normally.

The foregoing steps of the overvoltage protection may be directly performed by the controller 301, or may be performed by an overvoltage protection unit 305 inside the controller 301. The overvoltage protection unit 305 is a logic module inside the controller 301 and may include a microprocessor and a memory. The memory stores instructions, and the microprocessor reads the instructions to perform the steps of the overvoltage protection. The steps of the overvoltage protection may be as shown in FIG. 6. FIG. 6 is a flowchart of the steps of the overvoltage protection according to an embodiment. The process includes the following steps.

601: Detect the input voltage Vin and the output voltage Vo of the converter.

In this embodiment, the controller 301 may separately detect the input voltage Vin and the output voltage Vo of the converter through the voltage detection unit 304. This is similar to the description of the voltage detection unit 304 in the foregoing embodiment, and details are not described herein again.

602: Detect whether the output voltage Vo of the converter is greater than the first threshold Vth 1 and perform step 603 if the output voltage Vo of the converter is greater than the first threshold Vth 1, or perform step 605, if the output voltage Vo of the converter is not greater than the first threshold Vth 1.

In this embodiment, when the controller detects that the output voltage Vo of the converter is greater than the first threshold Vth 1, step 603 is performed (the switching transistor Q2 is turned on), so that the converter is bypassed. When the controller detects that the output voltage Vo of the converter is not greater than the first threshold Vth 1, step 605 is performed (the switching transistor Q2 is turned off).

603: Turn on the switching transistor Q2.

In this embodiment, when the controller 301 controls the switching transistor Q2 to be turned on through the drive 303, a current received by the converter flows through the switching transistor Q2. In this case, the converter is bypassed, and a component inside the converter is not damaged.

In some cases, the controller may turn on the switching transistor Q2 and turn off the switching transistor Q1 at the same time, to prevent the current from impacting the input terminal of the converter. If the switching transistor Q1 is turned off, only the switching transistor Q2 may be turned on.

604: Detect whether the input voltage Vin of the converter is greater than the second threshold Vth 2 and perform step 605 if the input voltage Vin of the converter is greater than the second threshold Vth 2, or return to step 603 if the input voltage Vin of the converter is not greater than the second threshold Vth 2.

In this embodiment, that the input voltage Vin of the converter is less than the second threshold Vth 2 indicates that the input voltage will not continue to provide electric energy for the auxiliary power supply 302. Therefore, the controller may perform step 605 to turn off the switching transistor Q2, so that the current may flow through the input terminal of the converter, and the input voltage Vin increases again.

605: Turn off the switching transistor Q2.

In this embodiment, after the controller 301 turns off the switching transistor Q2, the current may be transmitted to the input terminal of the converter through a diode antiparallel with the switching transistor Q1, so that the input voltage Vin increases again.

Figure 7:
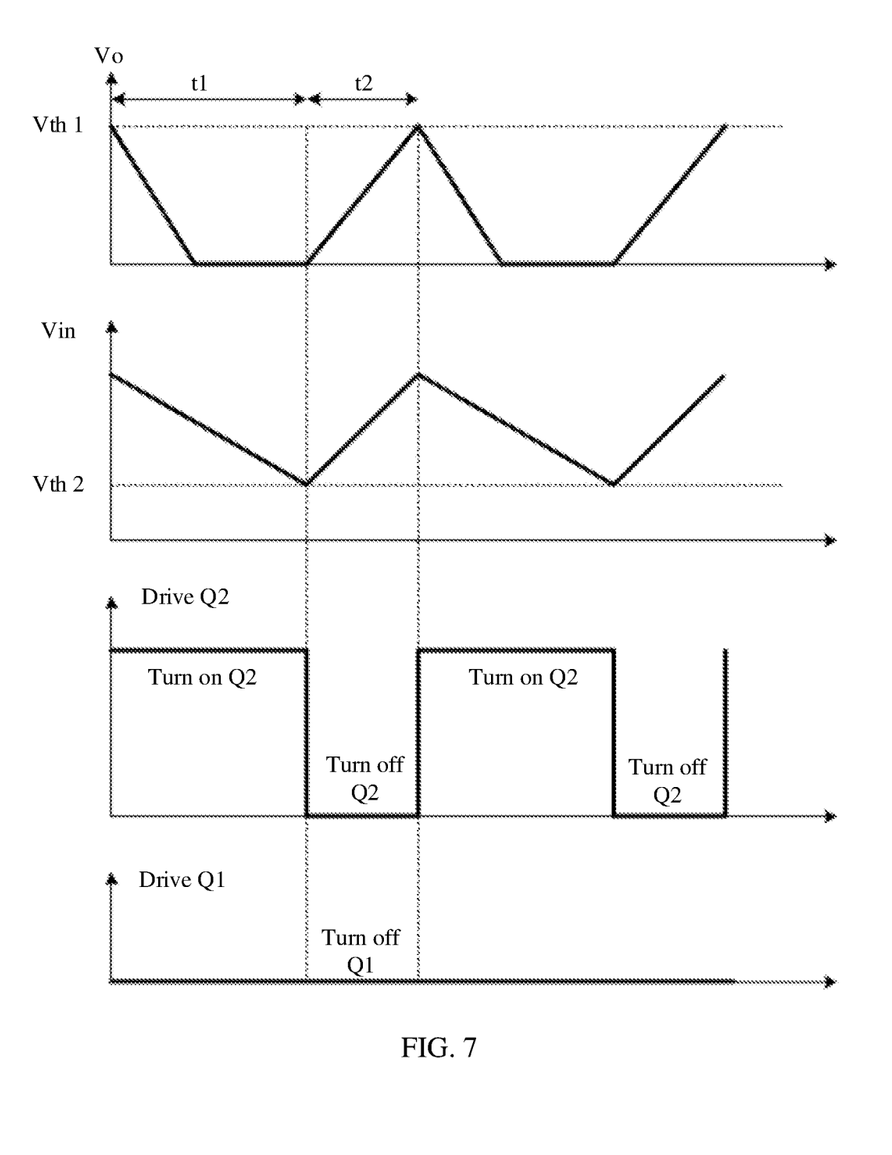
FIG. 7 is a voltage sequence diagram corresponding to the steps in FIG. 6.

FIG. 7 is a voltage sequence diagram corresponding to the steps in FIG. 6. At the beginning of t1 duration, the controller 301 detects that the output voltage Vo of the converter exceeds the first threshold Vth 1. In this case, the switching transistor Q2 is turned on (and the switching transistor Q1 is turned off). Therefore, the converter is bypassed, and the input voltage and the output voltage of the converter decrease.

After the t1 duration, the input voltage Vin of the converter is less than the second threshold Vth 2. In this case, the controller 301 may turn off the switching transistor Q2, so that the converter is not bypassed, the current may flow into the converter again, and the input voltage and the output voltage of the converter may increase.

After t2 duration, the output voltage of the converter is greater than the first threshold Vth 1. In this case, the controller 301 may turn on the switching transistor Q2, so that the converter is bypassed, and the input voltage and the output voltage of the converter decrease.

In this embodiment, the controller 301 turns on or off the switching transistor Q2 based on a condition of the input voltage and the output voltage of the converter, so that the input voltage and the output voltage of the converter circularly decrease and increase and are always kept in a reasonable range. Therefore, no damage is caused to the component inside the converter, and a problem that the converter is damaged when the output voltage of the converter is excessive high is resolved.

Figure 8:
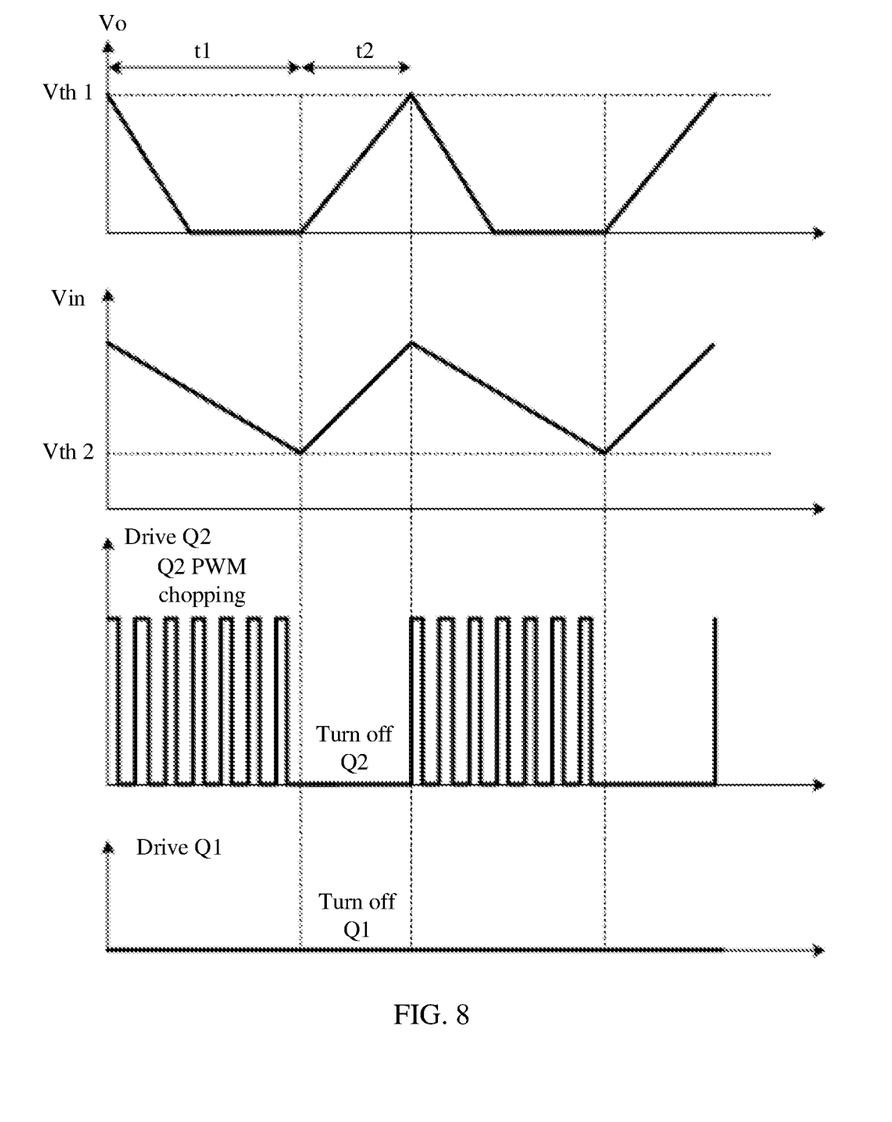
FIG. 8 is a corresponding sequence diagram when a controller 301 turns on a switching transistor Q2 through PWM chopping according to an embodiment.

In some other embodiments, the controller 301 may control the switching transistor Q2 to be turned on through pulse width modulation (PWM) chopping, as shown in FIG. 8.

FIG. 8 is a corresponding sequence diagram when the controller 301 turns on the switching transistor Q2 through PWM chopping according to an embodiment.

In the embodiment corresponding to FIG. 8, the controller 301 turns on the switching transistor Q2 through PWM chopping. As shown in FIG. 8, the switching transistor Q2 performs PWM based on a duty ratio. The duty ratio may be set based on an actual condition. This is not limited in this embodiment.

In the embodiment corresponding to FIG. 8, the controller 301 turns on the switching transistor Q2 through PWM chopping, to slow down the decrease of the output voltage Vo and the input voltage Vin of the converter, so that the controller 301 does not need to frequently switch a control state, to improve system stability. Another case of this embodiment is similar to that of the foregoing embodiments, and details are not described herein again.

The first threshold Vth 1, the second threshold Vth 2, the preset time threshold, and the like in each foregoing embodiment may be set based on an actual condition. In this embodiment, values of the foregoing thresholds are not limited.

An embodiment further provides a converter, including a converter circuit. The converter circuit is similar to the circuit corresponding to FIG. 2. An input terminal of the converter circuit is connected to at least one photovoltaic panel, and an output terminal of the converter circuit is connected to a power grid.

The converter may include the serial-parallel converter protection system shown in FIG. 3. The serial-parallel protection system is connected to the converter circuit through a switching transistor Q1 and a switching transistor Q2 and is similar to that in FIG. 3. Details are not described herein again.

Alternatively, the converter may include a controller. The controller is similar to the controller 301 in the embodiment corresponding to FIG. 3, and details are not described herein again. The controller may be connected to the switching transistor Q1 and the switching transistor Q2 through a drive. In some embodiments, the converter further includes an auxiliary power supply which is similar to the auxiliary power supply 302 in the embodiment corresponding to FIG. 3.

It can be clearly understood by a person skilled in the art that, for a purpose of convenient and brief description, for detailed working processes of the foregoing system, apparatus, and unit, refer to corresponding processes in the foregoing method embodiments. Details are not described herein.

In the several embodiments, it should be understood that the system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments may be integrated into one processing unit, or each of the units may exist alone physically, or two or more units may be integrated into one unit. The integrated unit may be implemented in a form of hardware or may be implemented in a form of a software functional unit.

When the integrated unit is implemented in the form of a software functional unit and is sold or used as an independent product, the integrated unit may be stored in a computer-readable storage medium. Based on such an understanding, the embodiments may be implemented in the form of a software product. The computer software product is stored in a non-transitory storage medium and includes several instructions for instructing a computer device (which may be a personal computer, a server, or a network device) to perform all or some of the steps of the methods described in the embodiments. The foregoing non-transitory storage medium includes any medium that can store program code, such as a USB flash drive, a removable hard disk, a read-only memory (ROM), a random access memory (RAM), a magnetic disk, or an optical disc.

What is claimed is:

1. A serial-parallel converter protection system; comprising:
   a controller;
   a drive;
   a first switching transistor, wherein an input terminal of a converter is connected to an output terminal of the converter through the first switching transistor and the controller is connected to the first switching transistor through the drive and is configured to control the first switching transistor;
   a second switching transistor, wherein the output terminal of the converter is connected in parallel with the second switching transistor, the controller is connected to the second switching transistor through the drive and is configured to control the second switching transistor; and
   a voltage sensor configured to separately detect an input voltage and an output voltage of the converter, wherein, after the output voltage of the converter is greater than a first threshold, the controller controls the first switching transistor to be turned off and controls the second switching transistor to be turned on.

2. The serial-parallel converter protection system according to claim 1, wherein the input terminal of the converter is connected in parallel with a first capacitor, the output terminal of the converter is connected in parallel with a second capacitor, and an inductor is disposed on a connection cable between the second capacitor and the second switching transistor.

3. The serial-parallel converter protection system according to claim 1, further comprising:
an auxiliary power supply, wherein the auxiliary power supply is connected in parallel with the input terminal of the converter.

4. The serial-parallel converter protection system of claim 3, wherein the auxiliary power supply is connected to the controller and the drive and is configured to output the obtained electric energy to the controller and the drive.

5. The serial-parallel converter protection system according to claim 1, wherein the first switching transistor is anti-parallel with a first diode and the second switching transistor is anti-parallel with a second diode.

6. The serial-parallel converter protection system according to claim 5, wherein, after the input voltage of the converter is less than a second threshold, the controller is configured to control both the first switching transistor and the second switching transistor to be turned off.

7. The serial-parallel converter protection system according to claim 1, wherein, after the output voltage of the converter is greater than the first threshold for a duration greater than a preset time threshold, the controller is configured to control the second switching transistor to be turned off and re-detects the output voltage of the converter; and.

8. The serial-parallel converter protection system according to claim 1, wherein the controller is configured to control, through pulse width modulation (PWM) chopping, the second switching transistor to be turned on.

9. The serial-parallel converter protection system of claim 8, wherein the second switching transistor is configured to perform PWM based on a duty ratio set based on an actual condition.

10. The serial-parallel converter protection system of claim 1, wherein, after the output voltage of the converter is greater than the first threshold, the controller is configured to control the first switching transistor to be turned off and control the second switching transistor to be turned on.

11. The serial-parallel converter protection system of claim 1, wherein, after the output voltage of the converter is not greater than the first threshold, the converter is configured to operate normally.

12. A conversion control method applied to a converter, the conversion control method comprising:
separately detecting, with a voltage sensor, an input voltage and an output voltage of the converter, wherein an input terminal of the converter is connected to an output terminal of the converter through a first switching transistor and the output terminal of the converter is connected in parallel with a second switching transistor, and
when the output voltage of the converter is greater than a first threshold, controlling, by a controller, the first switching transistor of the converter to be turned off and the second switching transistor of the converter to be turned on.

13. The conversion control method according to claim 12, wherein the controller is further configured to:
after the input voltage of the converter is less than a second threshold, control both the first switching transistor and the second switching transistor to be turned off.

14. The conversion control method according to claim 12, wherein after controlling both the first switching transistor and the second switching transistor to be turned off when the input voltage of the converter is less than the second threshold, the controller is further configured to:
re-detect the output voltage of the converter.

15. The conversion control method according to claim 12, wherein, after the output voltage of the converter is greater than the first threshold for a duration greater than a preset time threshold, the controller is further configured to:
control the second switching transistor to be turned off and re-detect the output voltage of the converter.

16. The conversion control method of claim 12, wherein, after the output voltage of the converter is greater than the first threshold, the controller is configured to control the first switching transistor to be turned off and control the second switching transistor to be turned on.

17. The conversion control method of claim 12, wherein, after the output voltage of the converter is not greater than the first threshold, the converter is configured to operate normally.

18. A converter comprising:
a converter circuit; and
a controller, wherein an input terminal of the converter circuit is connected to at least one photovoltaic panel, and an output terminal of the converter circuit is connected to a power grid;
a first switching transistor is connected between the input terminal and the output terminal of the converter circuit;
a second switching transistor is connected to the output terminal of the converter circuit; and
a voltage sensor configured to separately detect an input voltage and an output voltage of the converter, wherein, after the output voltage of the converter is greater than a first threshold, the controller controls the first switching transistor to be turned off and controls the second switching transistor to be turned on.

* * * * *